Patented Mar. 17, 1931

1,796,733

UNITED STATES PATENT OFFICE

ORRELL O. THWING, OF NEW YORK, N. Y.; ANNIE THWING, EXECUTRIX OF SAID ORRELL O. THWING, DECEASED, ASSIGNOR TO GENERAL OIL GAS CORPORATION, OF NEW YORK, N. Y., A CORPORATION OF VIRGINIA

MANUFACTURE OF GAS FROM FLUID FUELS

Application filed April 1, 1925. Serial No. 19,752.

The invention relates to a retort for the production of a fixed combustible gas and in the specific form shown the retort is particularly adapted to the production of combustible gas according to a method by which the gas making fuel to wit, liquid hydrocarbon, for example such as fuel oil or gas oil, or in fact any fuel in fluid form in contrast to a fuel in solid form, as pulverized coal, and combustion supporting fluid or gas, to wit, oxygen supplying medium, as air are introduced (preferably continuously) into a maintained hot gasifying zone under conditions and in proper proportions to cause the necessary reactions to produce the desired gas; and one of the characterizing features of this specific aspect of the invention revolves about the maintenance of the ratio of the gas making fuel relative to the combustion supporting gas by increasing the supply of fuel immediately following any temperature increase in the gasifying zone and conversely by reducing the supply of fuel immediately following any decrease of temperature, for the reason that a selected or predetermined ratio between these factors must be maintained with only slight variations in order to produce gas having satisfactorily constant calorific value and composition. This ratio is not infrequently disturbed in practical operation, either accidentally or as by obstructions in delivery means or as by changes in density of the gas making mediums through heating; or, intentionally, as for the purpose of increasing or decreasing the rate at which gas is produced; or as for deliberately changing its characteristics. Any change in the relative proportions of the gas making mediums (combustion supporting gas and gas making fuel) is immediately followed by a change in the temperature of the gasifying zone. For example, if the combustion supporting gas increases relative to the fuel then the temperature of the gasifying zone increases and conversely if the gas making fuel increases relative to the combustion supporting gas the temperature of said zone decreases.

By the retort or gas generator (each name being proper and applicable to the part to which it relates and is frequently employed herein) to which the invention is directed one is enabled to produce by a continuous method a desired combustible gas of relatively constant composition and within reasonable limits of substantially any desired practically constant calorific value.

It will be noted that the relative proportions of the gas making ingredients, as the process and reaction proceeds, and the temperature conditions of the gasifying zone within the retort become functions of each other and the type of resulting gas is dependent upon the factors mentioned.

In the manufacture of gas within or by the apparatus shown and described advantage, as above indicated, is taken of the principle that where the gasifying zone becomes too hot the temperature thereof can be lowered by increasing the amount of gas making fuel delivered to the gasifying zone. This result is realized because the increased fuel supply causes the heat from the resulting partial combustion within the gasifying zone to be less in proportion to the heat required for gasifying the fuel, with a consequent lower resulting temperature. There likewise follows an increased temperature within the gasifying zone if the gas making fuel is reduced whereby the heat from the partial combustion correspondingly increases in proportion to the heat required for gasifying the fuel.

One object of the invention is to construct a retort so as to maintain a constant predetermined temperature in a gas making chamber of the retort by ensuring—preferably automatically—the proper relative amount of fuel in ratio to the combustion supporting gas so as to substantially hold constant the predetermined temperature, regardless of fluctuations in the quantity of combustion supporting gas supplied to the chamber.

Another object of the invention is to construct the retort so as to automatically maintain a substantially constant predetermined gasifying temperature irrespective of any change in the quantities of gas making ingredients.

The invention according to certain specific aspects thereof particularly relates to an apparatus having a thermostat within the gasifying zone and associated with a fuel supply means whereby the desired ends are automatically realized as the apparatus functions, but the invention according to certain aspects of a broad or more generic character relates to retorts having certain characteristics of valuable and important functional, practical and commercial character in the gas making industry and as to these more generic aspects the invention applies not merely to retorts which employ the thermostat for maintaining the proper fuel and temperature regulations and conditions but also to retorts which may employ other control means and which retorts do not have or of necessity have thermostatic means for ensuring the regulation of fuel and combustion supporting gas in order to produce within the retorts the desired fixed combustible gas.

Further aspects and features of the invention will be apparent from that which follows.

As illustrating a specific form of apparatus within and by which the invention is realized or embodied reference is made to the accompanying drawing forming a part of this specification and in which drawing, Figure 1 is a vertical sectional view of a gas generator or retort by which the invention is realized. Figure 1 is a vertical view taken as on the plane indicated by the line 1—1 of Figure 2.

Figure 1:
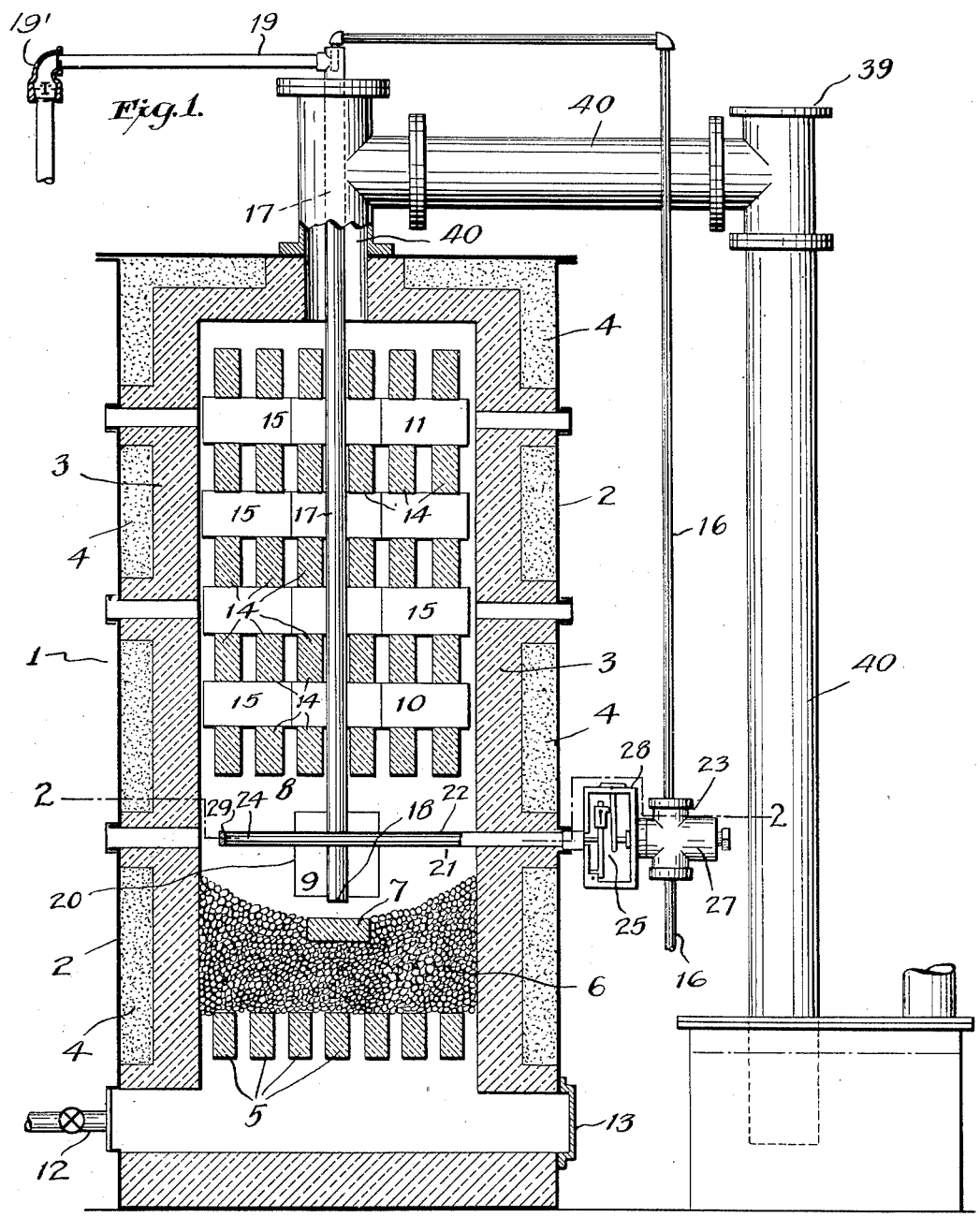
Figure 2:
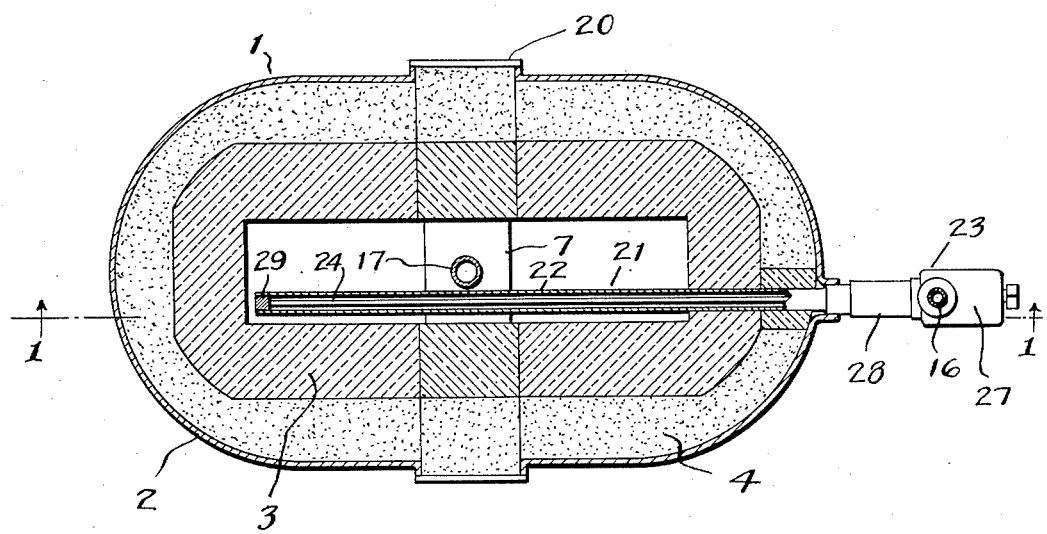
Figure 2 is a horizontal sectional view taken as on the planes indicated by the broken line 2—2 of Figure 1.

Referring to the drawing in detail,

The retort or fluid fuel gas generator 1 has a gas-tight metal shell 2 which in the main is of sheet steel, a refractory inner wall or lining 3 and a heat insulating section 4 of such material as "silocel" brick, asbestos or other suitable insulating material. At the lower portion of the retort there is a series of refractory bricks 5 constituting a grate upon which there is supported a bed of refractories 6, as pieces of carborundum, in which there is lodged or embedded a plate 7 of high refractory material (as carborundum) that serves as a deflecting plate and upon which the incoming gas making ingredients initially strike. This deflecting plate 7 is sometimes herein referred to as an impingement plate and constitutes or provides what may be termed an inwardly facing deflecting plate or portion. This refractory bed and the upright and top portions of the inner wall or lining 3 define a gasifying chamber which includes the gasifying zone 8 or reaction zone as it may be termed, that comprehends the initial gasifying and ignition portion 9, a gasifying and fixing portion 10, or gas fixing portion as it may be termed, and a cooling or final heat storing portion 11. The retort has an air inlet pipe or opening 12 by or through which air is introduced for the heating up of the retort to operating temperatures. This pipe 12 is normally closed. A door or suitable closure 13 can be opened as desired to insert fuel for the heating up process or for cleaning out of the retort. This door or closure 13 is normally closed. Within the gasifying zone there is shown checkerwork of refractory bricks as 14 and 15 which serve to take on and give off heat as the process functions. These bricks "fix" the gas started in the initial gasifying portion 9 and the gas gives off some of its heat in passing through the upper portion of the checkerwork on its way from the retort.

The gas making apparatus has an oil supply pipe line 16 that receives fuel oil (or any suitable liquid hydrocarbon and which may be broadly referred to as gas producing fuel) from any suitable source of supply and this oil supply pipe 16 discharges into a mixing tube 17 that extends downwardly into the gasifying zone. Tube 17 terminates at 18 a short distance above the deflecting or impingement plate 7. Air (or any suitable oxygen-containing medium and which may be broadly referred to as a combustion supporting fluid or gas) is supplied through the air pipe line 19 that discharges into the mixing tube 17 wherein the air intermingles with the oil from supply pipe 16 during their passage together to the discharging point 18, thereby forming a homogeneous mixture that is discharged at 18 into the initial gasifying and ignition portion 9 of the gasifying zone 8. It will be apparent that the mixed air and oil become preheated before delivery into the gasifying zone and are in condition to instantaneously ignite and produce the partial combustion necessary for the gasifying process. A door or closure 20 can be used to permit access to the initial gasifying portion 9 when desired.

Figure 3:
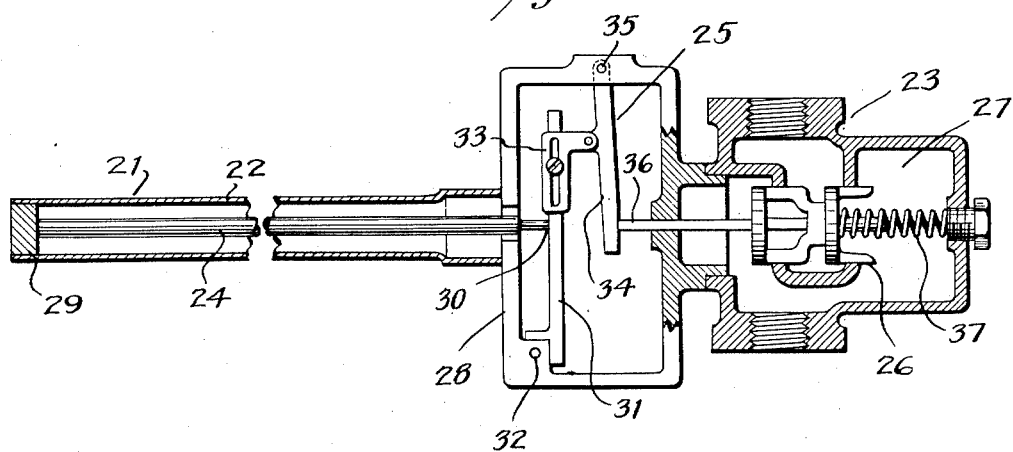
Figure 3 is a vertical sectional view of a thermostat and associated valve mechanism that is adapted for use in the apparatus of Figures 1 and 2.

A thermostat 21 extends into the initial gasifying portion 9 of the gasifying zone 8 and is arranged and associated so as to indirectly control the temperatures at this place. The thermostat has a member 22 of high expansion characteristics associated with a valve casing 23 and a member 24 of low expansion characteristics connected with suitable motion multiplying mechanism 25 that in turn is operatively associated with a valve member 26 in the valve casing 23. A valve 27 which includes the valve casing 23 and valve member 26 is in the oil pipe line 16 and the construction and arrangement of the parts are such that the higher the temperature within the gasifying zone the greater is the opening through the valve 27 and vice versa, as is apparent from the construction shown in Figure 3. Consider the valve casing 23 a fixed member; the thermostat member 22 is carried thereby or it may be fixedly connected therewith by a frame 28 for the motion multiplying mechanism 25. The thermostat members 22 and 24 are connected at 29 at the innermost ends of said members. The outer end of the member 24 which is of low expansion characteristics contacts at 30 with lever 31 which in turn is pivotally connected at 32 to the frame 28. The free end portion of the lever 31 actuates, preferably by adjustable slidable member 33, the lever 34 which is in turn pivotally connected at 35 to the frame 28. The free end of the lever 34 is associated with a valve stem 36 of the valve member 26 and operates in opposition to the compression spring 37 that continuously presses the valve member toward and the valve stem into association with said lever 34.

By and dependent upon the adjustment of the slidable member 33 any temperature within reasonable limits may be selected as the desired temperature and any change from that selected temperature will cause the thermostat to operate.

The function of this thermostat and valve member controlled thereby, whereby the flow of oil is regulated, is believed to be manifest without further description.

Assuming the fluid fuel gas generator is already heated to the proper temperature for making the desired gas, it will be noted that combustion supporting fluid, such as air, ozonized air or oxygen and likewise oil both in regulated quantities, can be delivered through the mixing tube 17 to the point 18 from which they are delivered into the gasifying zone 8. The air and oil in their transit through pipe 17 thoroughly intermingle and take on more or less heat with the result that a mixture of relatively hot combustion supporting gas and hot gas making fuel are delivered in practically the requisite quantities or ratios for the making of the desired gas. For example, if one desires to make a 450 B. t. u. gas of relatively constant composition and calorific value from a certain oil this can be accomplished by directing the oil and heated air into a gasifying zone having a temperature in the initial and main gasifying portions of approximately 1600° F. The way in which such a gas is maintained more or less uniform is, as previously indicated, by cutting down the supply of oil to the gasifying zone if the temperatures within the gasifying zone diminish and by increasing the supply of oil if the temperatures rise. While this at first appears in a general way to upset the process, it will be noted that an almost immediate change in the combustion temperature follows so that there is a general, quick and relatively uniform regulation of the temperatures within the retort and for an extended period there will be practically uniform maintenance of the temperature conditions within the retort and a relatively constant production of gas of constant characteristics and calorific value.

When it is desired to increase or decrease the rate at which gas is produced, it is only necessary to increase or decrease the quantity of combustion supporting gas to mixing tube 17 by means of a valve 19' (diagrammatically indicated) in pipe line 19 such valve preferably being a constant volume or demand limiting valve of the commonly known type of valve shown in the patent to Fisher 1,456,766, dated May 29, 1923, in order to deliver a constant volume of air from a source of supply of air having a higher pressure than is ordinarily used to flow through the line 17. Whereupon, if the quantity of combustion supporting gas is increased, the temperature of combustion will immediately ascend and by means of the operation of the thermostat the supply of oil will be promptly increased and the proper proportions of gas making mediums and temperature conditions will be restored. The converse of the operation obviously follows according to the apparatus shown.

It will be manifest that by changing the proportions of air or combustion supporting fluid relative to the oil or gas making fuel and a consequent change of the temperature conditions within the retort one is enabled within practicable ranges to produce a desired type or character of gas. The gases produced will be what is known as uncondensable gases; of course there will be incident to this process as there is incident to all gas processes a production of a certain amount of tars which can be condensed, washed out or otherwise removed from the gas.

Mention has heretofore been made as to the bringing of the retort to gas making temperatures. It is believed that means whereby this is accomplished is apparent to one skilled in the art of gas manufacture and the preferred method is to discharge a mixture of air and oil through the mixing tube 17 into the initial gasifying and ignition portion 9, igniting the mixture from 18 by means of kindling or a torch inserted through a properly located door, as 20, and further supplying air through air inlet 12 and pervious body 6 to produce complete combustion and allowing the products of combustion to pass to the atmosphere through suitable purge valve, as 39, during the heating up period.

From an inspection of the drawings it will be manifest that the piping leading from the interior of the retort to the purge valve 39 is part of the gas off-take piping or means 40 that conducts gases from the interior of the retort; to wit, from within the upper interior portion of the gas generating zone, namely, from the cooling and final heat portion of the gas generating zone to the usual seal and other usual purifying apparatus. It is also clear from the drawings and from what has preceded that the mixing tube 17 extends downwardly and in succession (a) into and through the cooling zone and heat storing portion 11 and the checkerwork of refractory brick in the upper portion of the gasifying zone or reaction zone; (b) thence into and through the gas fixing portion 10 and the checkerwork of refractory brick therein; and (c) into and terminating within the initial ignition portion 9 at the lower portion of the gasifying or reaction zone 9. It is also clear that by the process carried out within the retort there are produced gases, resulting from the process or reaction following the ignition that takes place in the ignition portion 9, which gases travel successively upwardly into and through the gas fixing portion 10 and the cooling and heat storing portion 11 and contact during their travel with the checkerwork in said portions 10 and 11 whereby heat from the upwardly moving gases is transmitted to and through the walls of the mixing tube into the counter moving mixture within the tube; to wit, to the downwardly moving mixture of fuel and combustion supporting gas which upon delivery from the lower end of the mixing tube impinges in an already heated, viz preheated, condition against the inner face of the impingement and deflection plate 7 so that the ignition takes place and the consequent reaction starts in the ignition portion of the reaction or gasifying zone.

A typical oil gas produced within and by the Thwing retort may be described as follows:

Temperature of generator 800 degrees C.

| | |
|---|---|
| Carbon dioxide | 5.4% by volume |
| Illuminants | 12.0% |
| Oxygen | 0.5% |
| Carbon monoxide | 8.7% |
| Hydrogen | 3.9% |
| Methane | 7.6% |
| Nitrogen | 61.9% |
| | 100.0% |

| | |
|---|---|
| B. t. u. of gas produced per cu. ft. | 400 |
| Volume of gas produced per lb. of oil (cu. ft.) | 39.2 |
| Efficiency | 83.0% |

The expression or word retort as employed herein is not intended to necessarily define a structure which is externally heated, to wit, a structure or vessel into which heat is transmitted from the exterior through the walls thereof, but said word retort as used herein has a broader or more general significance and is to be understood as defining, according to terse language, a structure or vessel in which substances, particularly fluid fuels, are decomposed by heat as when the fluid fuels and oxygen containing gases are mixed and are fed into the hot interior of the retort so that they react and form or re-form into other compositions or products in the presence of and due to heat and the other factors that function or follow. The retort of the present invention provides, as previously clearly set forth, a structure or apparatus by which a gas making or gas fixing operation can be carried out within a refractory structure providing (a) a gasifying zone or a reaction zone which comprehends an initial ignition portion, a gas fixing portion, and a final heat storing portion; and (b) certain checkerwork of refractory brick arranged with respect to certain defined parts of the retort or apparatus in such manner that the advantageous results of the structure are realized as the gas generator or retort functions.

It will be manifest that the invention may be realized in various ways without departing from the spirit and scope thereof.

What I claim is—

1. A gas generator having a metal shell with a refractory interior defining a gasifying zone which includes in succession an initial ignition portion located in the lower portion of the gasifying zone, a gas fixing portion extending upwardly from the initial ignition portion and a cooling or final heat storing portion extending upwardly from the gas fixing portion and located in the upper portion of the gasifying zone, said gas generator having a checkerwork of refractory brick located within the gasifying zone so that some of the checkerwork is in the gas fixing portion and so that some of the checkerwork is within the cooling or final heat storing zone, the gas generator also having (a) a mixing tube which extends inwardly and downwardly through the refractory checkerwork of the cooling and final heat storing portion and of the gas fixing portion, and finally terminates within the initial gasifying and ignition portion a short distance from an inwardly facing impingement and deflecting portion of the refractory interior; (b) a fuel supply pipe with a fuel valve therein which fuel supply pipe discharges fuel in fluid form into the mixing tube; (c) a pipe that discharges an oxygen-containing ingredient into the mixing tube; (d) a gas off-take pipe for conducting generated gas from within the upper portion of the gasifying zone; and (e) a thermostat extending into the ignition portion of said gasifying zone, which thermostat is connected with said fuel valve whereby the latter is operated by the thermostat so that the fuel supply is respectively decreased or increased directly as the temperature within the gasifying zone decreases or increases.

2. A retort having a gas-tight metal shell with a refractory interior defining a gasifying chamber having therein a gasifying zone which comprehends in succession an initial gasifying portion, a gas fixing portion with checkerwork therein of refractory brick and a cooling or final heat storing portion with checkerwork therein of refractory brick, the refractory interior having an inwardly facing deflecting portion, the top of the retort having a suitable off-take means for the conducting from the gasifying zone of the gases produced by the process carried out within the retort, the retort also having a mixing tube extending inwardly into the cooling portion through the checkerwork thereof, thence into the gas fixing portion through the refractory checkerwork thereof, and finally into and terminating within the initial gasifying portion, the delivery end of said mixing tube being adjacent but opposed to and separate from said deflecting portion, the retort having a pipe by which an oxygen-containing gas is delivered into said mixing tube and also a fuel supply pipe provided with control means by which a regulated amount of fluid fuel is delivered into said mixing tube whereby the oxygen-containing gas and fuel flowing along the interior of the mixing tube are intimately mixed and receive heat imparted thereto through the walls of the mixing tube from the gases resulting from the process which takes place in the gasifying chamber and which heat is imparted to the incoming mixture from the hot gases resulting from the process while the hot gases are flowing, in a direction counter to the flow of the incoming mixture, toward, into and through the cooling or final heat storing portion and into the off-take means.

3. A gas-tight retort having a metal shell with a refractory interior lining defining a gasifying chamber with a reaction zone therein which includes in succession an initial ignition portion, a gas fixing portion with checkerwork thereof of refractory brick, and a final heat storing portion with checkerwork thereof of refractory brick, the refractory of the interior having a deflecting portion providing an inner face of the initial ignition portion, the retort having a suitable off-take for the conducting from the final heat storing portion of gases produced by the process carried out within the retort, said retort also having a mixing tube extending inwardly and passing successively into and through the checkerwork of the final heat storing portion, the checkerwork of the gas fixing portion, and into said initial ignition portion and terminating below the checkerwork, the delivery end of said mixing tube being adjacent but opposed to and separated from said deflecting portion and arranged so that mixture therefrom is thereby delivered into a space below the checkerwork, the retort having an air pipe by which air is delivered into said mixing tube and also a fuel supply pipe by which suitable fuel in fluid form is delivered to the air flowing into and along the interior of the mixing tube whereby the air and fuel are intimately mixed and are heated while flowing along and through the mixing tube by heat transmitted to the mixture through the walls of the mixing tube from the hot gases resulting from the process taking place in the reaction zone and which heat transfer to the incoming mixture from the products of reaction takes place while the products of the reaction are passing in a direction counter to the flow of the incoming mixture and which products pass from the initial ignition portion through the checkerwork in the fixing portion, thence through the checkerwork in the final heat storing portion toward, into and out through the off-take.

In witness whereof I have hereunto signed my name.

ORRELL O. THWING.